United States Patent [19]

Oyadomari

[11] Patent Number: 5,361,335
[45] Date of Patent: Nov. 1, 1994

[54] INPUT-OUTPUT CHANNEL UNIT CAPABLE OF PREDICTING AN OVERRUN IN A DATA PROCESSING DEVICE

[75] Inventor: Hajime Oyadomari, Tokyo, Japan

[73] Assignee: NEC Corporation, Tokyo, Japan

[21] Appl. No.: 89,625

[22] Filed: Jul. 12, 1993

Related U.S. Application Data

[63] Continuation of Ser. No. 477,063, Feb. 8, 1990, abandoned.

[30] Foreign Application Priority Data

Feb. 8, 1989 [JP] Japan .................................. 1-27575

[51] Int. Cl.⁵ .......................................... G06F 13/00
[52] U.S. Cl. .............................. 395/250; 364/DIG. 1; 364/238.6; 364/238.9; 364/239; 364/239.1; 364/239.5; 364/239.6; 364/239.7
[58] Field of Search .............. 395/250, 200, 325, 425, 395/550

[56] References Cited

U.S. PATENT DOCUMENTS

| | | | |
|---|---|---|---|
| 3,568,165 | 3/1971 | Kerr | 395/275 |
| 3,579,195 | 5/1971 | Hallmark | 395/425 |
| 3,840,859 | 10/1974 | Vigil | 395/275 |
| 3,970,997 | 7/1976 | Daly et al. | 395/275 |
| 3,986,169 | 10/1976 | Kobayashi et al. | 340/146.1 |
| 4,285,038 | 8/1981 | Suzuki et al. | 395/275 |
| 4,344,132 | 8/1982 | Dixon et al. | 395/250 |
| 4,423,480 | 12/1983 | Bauer et al. | 395/325 |
| 4,435,762 | 3/1984 | Milligan et al. | 395/250 |
| 4,599,689 | 7/1986 | Berman | 395/250 |
| 4,607,348 | 8/1986 | Sheth | 395/275 |
| 4,613,954 | 9/1986 | Sheth | 395/250 |
| 4,663,706 | 5/1987 | Allen et al. | 395/200 |
| 4,663,730 | 5/1987 | Ikeda | 364/140 |
| 4,700,344 | 10/1987 | Kaino et al. | 370/94 |
| 4,748,588 | 5/1988 | Norman et al. | 395/550 |
| 4,772,888 | 9/1988 | Kimura | 340/825.5 |
| 4,809,155 | 2/1989 | Costes et al. | 395/325 |
| 4,860,193 | 8/1989 | Bently et al. | 395/250 |
| 4,881,248 | 11/1989 | Korechika | 377/17 |
| 5,019,966 | 5/1991 | Saito et al. | 395/550 |

FOREIGN PATENT DOCUMENTS

| | | | |
|---|---|---|---|
| 43227/79 | of 0000 | Australia | G06F 3/00 |
| 0031031 | 7/1981 | European Pat. Off. | G06F 13/00 |

OTHER PUBLICATIONS

"Fast Transmission Of Data With Quick 'Overrun' Recovery", IBM Technical Disclosure Bulletin vol. 24, No. 4, Sep. 1981, pp. 1850–1851.

Primary Examiner—Allen R. MacDonald
Assistant Examiner—Ayaz R. Sheikh
Attorney, Agent, or Firm—Foley & Lardner

[57] ABSTRACT

On transferring transfer data between a peripheral controller (11) and an input-output channel unit (12), an overrun predicting circuit (45) of the input-output channel unit predicts the occurrence of an overrun with reference to an amount of transfer data stored or memorized in a buffer memory (39) and produces an overrun prediction signal (46). The overrun prediction signal is delivered to the peripheral controller by a start informing acknowledgement signal line (15) which is used in transferring a start informing acknowledgement signal from the input-output channel unit to the peripheral controller before the transfer data is transferred between the peripheral controller and the input-output channel unit. Responsive to the overrun prediction signal, a strobe inhibiting circuit (21) of the peripheral controller inhibits delivery of a strobe pulse signal from the peripheral controller to the input-output channel unit during a predetermined time interval.

9 Claims, 2 Drawing Sheets

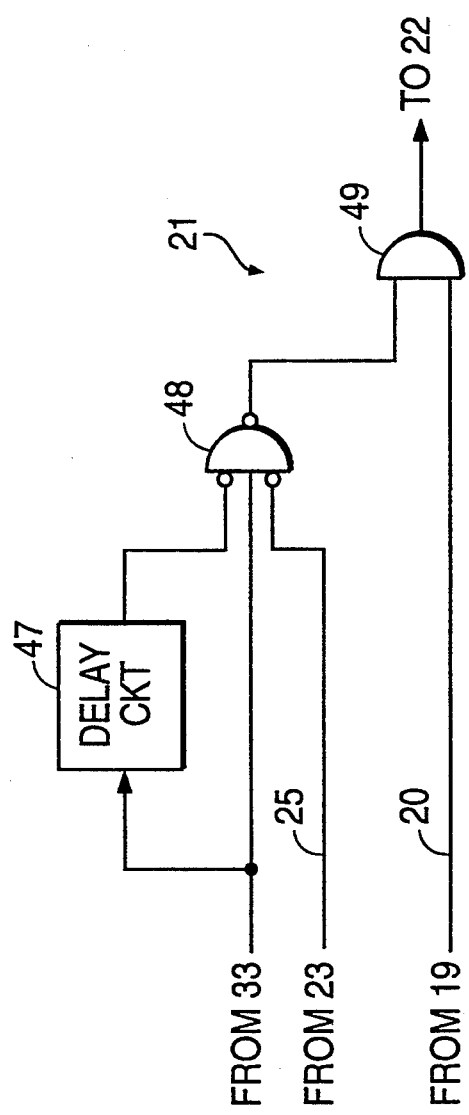

INPUT-OUTPUT CHANNEL UNIT CAPABLE OF PREDICTING AN OVERRUN IN A DATA PROCESSING DEVICE

This application is a continuation, of application Ser. No. 07/477,063, filed Feb. 8, 1990.

BACKGROUND OF THE INVENTION

This invention relates to a data transferring system for use in carrying out data transfer in a streaming manner between a peripheral controller and an input-output channel unit in a data processing device.

A data processing device of the type described, comprises an interface between the peripheral controller and the input-output channel. The interface comprises a data line, a start informing signal line (namely, an SCI line), a start informing acknowledgement signal line (that is, an SEO line), a strobe pulse signal line (or, an STI line), and a strobe pulse acknowledgement signal line (namely, an STO line).

The peripheral controller comprises a control circuit which comprises a strobe pulse signal generator for producing a strobe pulse signal to deliver the strobe pulse signal to the strobe pulse signal line. The control circuit further comprises a signal producer for producing, during a preselected time interval, a start code signal having a start code representative of a start of the data transfer. The signal producer produces a start informing signal of logic "1" level during production of the start code signal. The start informing signal is for informing the input-output channel unit of production of the start code signal. The signal producer delivers the start informing signal to the start informing signal line. Connected to the signal producer and the data line, a first buffer memory periodically memorizes and stores the start code signal as a memorized code signal at a first period which is determined by a strobe pulse acknowledgement signal. The first buffer memory delivers the first stored or memorized code signal to the data line.

The input-output channel unit comprises a first receiver connected to the start informing signal line for receiving the start informing signal as a received informing signal. Connected to the first receiver and the start informing acknowledgement signal line, a first transmitter transmits the received informing signal to the start informing acknowledgement signal line as a start informing acknowledgement signal to deliver the start informing acknowledgement signal to the control circuit. A register is connected to the data line and the first receiver. Enabled by the received informing signal, the register registers the memorized code signal as a registered code signal.

Connected to the strobe pulse signal line, a second receiver receives the strobe pulse signal as a received pulse signal. A second transmitter is connected to the second receiver and the strobe pulse acknowledgement signal line to transmit the received pulse signal to the strobe pulse acknowledgement signal.

A second buffer memory is connected to the data line and to a main memory. The first and the second buffer memory transmit transfer data between the main memory and a peripheral device connected to the second buffer memory through the data line under control of the strobe pulse signal and the strobe pulse acknowledgement signal after transfer of the start code signal.

In the data transferring system which carries out the data transfer in a streaming method, each of the strobe pulse line and the strobe pulse acknowledgement line is not put into an interlock state when the transfer data are transferred between the peripheral controller and the input-output channel unit. Therefore, when an overrun detecting circuit detects an overrun in the input-output channel unit, the input-output channel unit stops delivery of the strobe pulse acknowledgement signal to the strobe pulse acknowledgement signal line. The input-output channel unit further informs the peripheral controller of occurrence of the overrun. When the peripheral controller is informed that the overrun occurs in the input-output channel unit, the peripheral controller carries out a command retry processing in which a leading part of a transfer command memorized in the main memory is again transferred from the main memory to the peripheral controller.

The overrun mainly occurs in the input-output channel unit due to shortage of a memory capacity of the second buffer memory when access contention takes place between the input-output channel unit and other input-output channel units for the main memory.

Therefore, the input-output channel unit may again start accessing the main memory when a predetermined time interval lapses after occurrence of the contention. Inasmuch as the data transfer is suspended or stopped by stopping delivery of the strobe pulse acknowledgement signal from the input-output channel unit to the strobe pulse acknowledgement signal line when the overrun occurs, the command retry processing which needs a long time should be carried out.

When a small amount of the transfer data is transferred between the input-output channel unit and the peripheral controller, the data processing device is hardly influenced. When the transfer data has a long length, the data processing device is influenced in the following manner.

It will be assumed that the transfer data has an 8 MB (megabit) length and that the transfer data is transferred at an effective transmission rate which is equal to 3 MB per second. In this case, it is necessary in general to finish the data transfer at a time interval which is equal to 8/3 seconds. However, it is necessary in a worst case to finish the data transfer at another time interval of 16/3 seconds. Inasmuch as a long time is wasted in the worst case, the data processing system may be put in a system down state. In order to inhibit the system down state of the data processing device, the data processing device may be provided with a specific signal transmission line between the input-output channel unit and the peripheral controller. Such provision of the specific transmission line results in an increase of hardware of the data processing device.

SUMMARY OF THE INVENTION

It is therefore an object of this invention to provide a data transferring system which is capable of preventing an overrun which occurs in an input-output channel unit.

It is another object of this invention to provide a data transferring system of the type described, which comprises the input-output channel unit capable of predicting an overrun in order to prevent it.

It is still another object of this invention to provide a data transferring system of the type described, which has decreased hardware requirements.

Other objects of this invention will become clear as the description proceeds.

This invention relates to a data transfer system having a peripheral controller, an input-output channel unit, a first buffer memory in the peripheral controller, a second buffer memory in said input-output channel unit, a data line connecting said first and second buffer memories, an overrun predicting circuit, for producing and transmitting, before the data is transferred between the peripheral controller and the input-output channel, an overrun prediction signal, and a strobe inhibiting circuit contained in the peripheral controller, the strobe inhibiting circuit responsive to the overrun predicting circuit for inhibiting delivery of a strobe pulse signal from the peripheral controller to the input-output channel unit for a predetermined time interval.

The first buffer memory is connected to a peripheral device and the second buffer memory is connected to a main memory. A delay circuit and a receiver are connected between the overrun predicting circuit and the strobe inhibiting circuit.

BRIEF DESCRIPTION OF THE DRAWING:

FIG. 2 is a block diagram of a strobe inhibiting circuit of the data processing device illustrated in FIG. 1.

Figure 1:
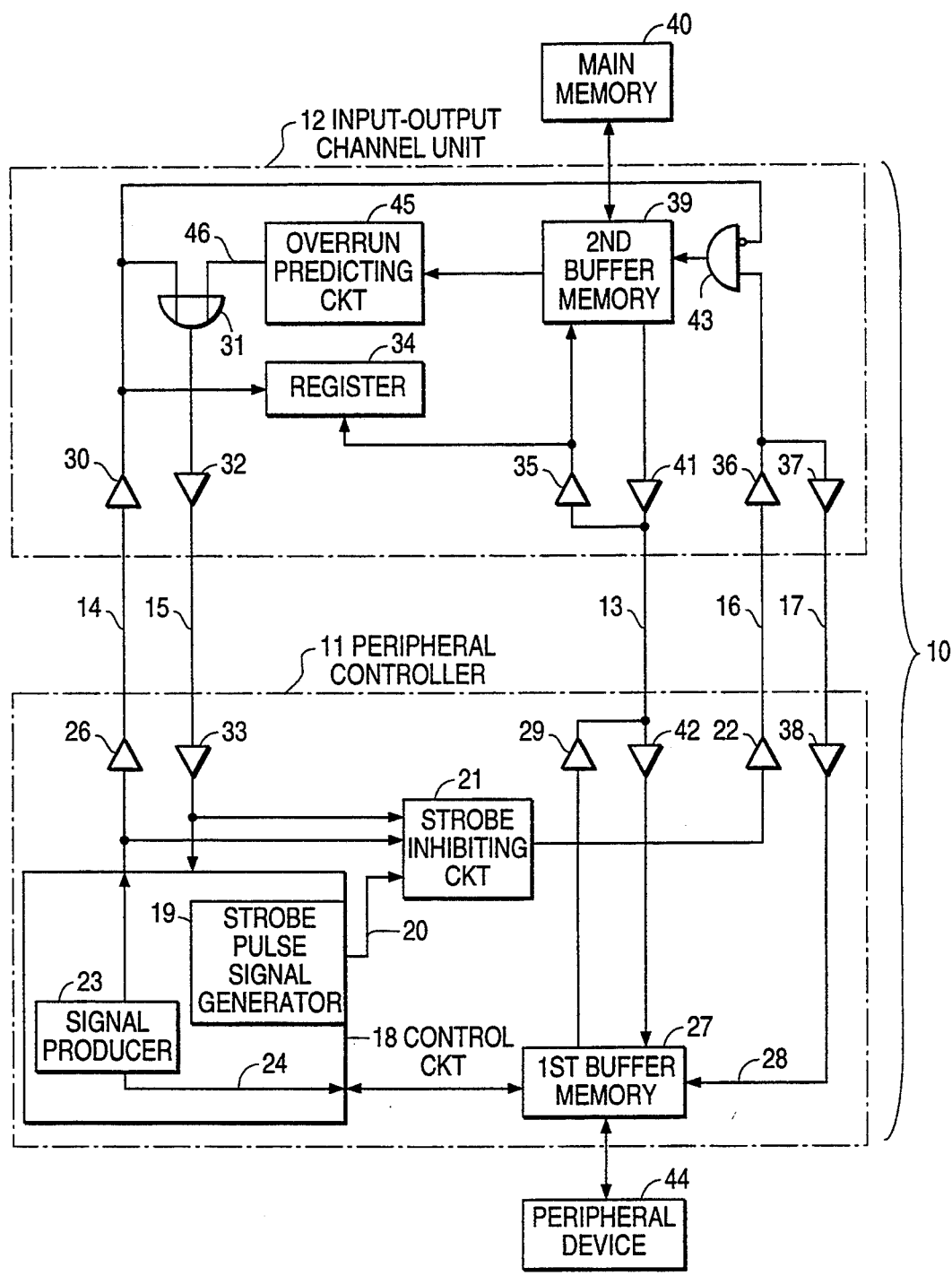
FIG. 1 is a block diagram of a data processing device comprising a data transferring system according to an embodiment of this invention.

DESCRIPTION OF THE PREFERRED EMBODIMENT:

Referring to FIG. 1, a data transferring system 10 according to a preferred embodiment of this invention is for use in carrying out data transfer between a peripheral controller 11 and an input-output channel unit 12 in a data processing device. Between the peripheral controller 11 and the input-output channel unit 12, the data processing device comprises a data line 13, a start informing signal line 14, a start informing acknowledgement signal line 15, a strobe pulse signal line 16, and a strobe pulse acknowledgement signal line 17. The start informing signal line 14, the start informing acknowledgement signal line 15, the strobe pulse signal line 16, and the strobe pulse acknowledgement signal line 17 are called in the art an SCI line, an SEO line, an STI line, and an STO line, respectively.

The peripheral controller 11 comprises a control circuit 18 comprising a strobe pulse signal generator 19 for producing a strobe pulse signal 20, to deliver to the strobe pulse signal line 16 through a strobe inhibiting circuit 21 and a strobe pulse signal driver 22. The strobe inhibiting circuit 21 will later be described. The control circuit 18 further comprises a signal producer 23 for producing, during a preselected time interval, a start code signal 24 having a start code representative of a start of the data transfer. The signal producer 23 produces a start informing signal 25 of logic "1" level during production of the start code signal 24. The start informing signal 25 is for use in informing the input-output channel unit 13 of production of the start code signal 24. The signal producer 23 delivers the start informing signal 25 to the start informing signal line 14 through a start informing signal driver 26.

Connected to the signal producer 23 and the data line 13, a first buffer memory 27 periodically memorizes the start code signal as a first memorized code signal at a first period which is determined by a strobe pulse acknowledgement signal 28. The first buffer memory 27 delivers the first memorized code signal to the data line 13 through a data driver 29.

The input-output channel unit 12 comprises a first receiver 30 connected to the start informing signal line 14. The first receiver 30 receives the start informing signal 25 as a received informing signal. Connected to the first receiver 30 through an OR circuit 31 and to the start informing acknowledgement signal line 15, a first transmitter or driver 32 transmits the received informing signal to the start informing acknowledgement signal line 15 as a start informing acknowledgement signal to deliver the start informing acknowledgement signal to the control circuit 18 through a start informing acknowledgement signal receiver 33. A register 34 is connected to the data line 13 through a data receiver 35 and to the first receiver 30. Enabled by the start informing signal 25, the register 34 registers the first memorized code signal as a registered code signal.

Connected to the strobe pulse signal line 16, a second receiver 36 receives the strobe pulse signal 20 as a received pulse signal. A second transmitter or driver 37 is connected to the second receiver 36 and the strobe pulse acknowledgement signal line 17. The second transmitter 37 transmits the received pulse signal to the strobe pulse acknowledgement signal line 17. A strobe pulse acknowledgement signal receiver 38 receives the received pulse acknowledgement signal as the strobe pulse acknowledgement signal 28.

The input-output channel unit 12 further comprises a second buffer memory 39 connected to a main memory 40 and to the data line 13 through the data receiver 35. The second buffer memory 39 is connected through another data transmitter or driver 41 to the data line 13 which is connected to the first buffer memory 27 through another data receiver 42.

An inhibit gate circuit 43 is connected to the first and the second receivers 30 and 36. The inhibit gate circuit 43 inhibits delivery of the received pulse signal to the second buffer memory 39 when memory receives the received informing signal of logic "1" level from the first receiver 30. When the received informing signal comes to have a logic "0" level after the first memorized code signal is registered in the register 34, the inhibit gate circuit 43 delivers to the second buffer memory 39 the received pulse signal delivered from the second receiver 36.

The strobe inhibiting circuit 21 is connected to the signal producer 23 and the start informing acknowledgement signal receiver 33.

On transmitting the start code signal 24 from the peripheral controller 11 to the input-output channel unit 12 through the data line 13, the strobe inhibiting circuit 21 receives the start informing signal of logic "1" level and the start informing acknowledgement signal of logic "1" level. On reception of the start informing signal of logic "1" level and the start informing acknowledgement signal of logic "1" level, the strobe inhibiting circuit 21 never inhibits delivery of the strobe pulse signal 20 to the strobe pulse signal line 16 in the manner which become clear as the description proceeds.

When such transferring operation of the start code signal 24 comes to an end, each of the start code signal line 14 and the start code acknowledgement signal line 15 comes to have a logic "0" level. In this case, the strobe inhibiting circuit 21 also never inhibits delivery of the strobe pulse signal 20 to the strobe pulse signal line 16 in the manner which will later become clear. As a result, it is possible to carry out the data transfer between the input-output channel unit 12 and the peripheral controller 11 in the following manner.

The first buffer memory 27 is connected to a peripheral device 44. The first and the second buffer memories 27 and 39 are for use in transferring transfer data between the main memory 40 and the peripheral device 44 through the data line 13 after the register 34 registers the memorized code signal. The first and the second buffer memories 27 and 39 are for memorizing the transfer data as first and second memorized data at the first period and a second period determined by the received pulse signal.

Connected to the second buffer memory 39, an overrun predicting circuit 45 predicts occurrence of an overrun with reference to an amount of the second memorized data to produce an overrun prediction signal 46 of logic "1" level. More specifically, the overrun predicting circuit 45 produces the overrun prediction signal 46 when the amount of the second memorized data is increased up to an upper threshold amount and when the amount of the second memorized data is reduced to a lower threshold amount which is lower than the upper threshold amount. Each of the upper and the lower threshold amounts is decided in consideration of an amount of the transferred data carried on the data line 13.

The overrun prediction signal 46 of logic "1" level is delivered to the strobe inhibiting circuit 21 through the OR circuit 31, the first transmitter 32, the start informing acknowledgement line 15, and the receiver 33. Responsive to the overrun prediction signal 46 of logic "1" level, the strobe inhibiting circuit 21 inhibits delivery of the strobe pulse signal to the strobe pulse signal line 16 during a predetermined time interval which is described above.

Referring to FIG. 2, the strobe inhibiting circuit 21 comprises a delay circuit 47 connected to the receiver 33. The delay circuit 47 delays the overrun prediction signal 46 (FIG. 1) by a delay equal to the predetermined time interval to produce a delayed prediction signal of logic "1" level. Responsive to an inverted signal of the delay prediction signal, the overrun prediction signal 46, and an inverted signal of a logic "0" level signal, an NAND circuit 48 produces an NAND signal. Responsive to the NAND signal and the strobe pulse signal 20, an AND circuit 49 produces an AND signal. With this structure, the strobe inhibiting circuit 21 inhibits delivery of the strobe pulse signal 20 to the strobe pulse signal line 16 in response to the overrun prediction signal 46.

What is claim is:

1. In a data transferring system for use in carrying out data transfer between a peripheral controller and an input-output channel unit in a data processing device comprising a data line, a start informing signal line, a start informing acknowledgement signal line, a strobe pulse signal line, and a strobe pulse acknowledgement signal line, said peripheral controller comprising: a strobe pulse generating means for producing a strobe pulse signal and for delivering said strobe pulse signal to said strobe pulse signal line; signal producing means for producing, during a preselected time interval, a start code signal having a start code representative of a start of said data transfer and for producing, during production of said start code signal, a start informing signal for use in informing said input-output channel unit of production of said code signal, said signal producing means delivering said start informing signal to said start informing signal line; and first storing means connected to said signal producing means and said data line for periodically storing said start code signal as a stored code signal at a first period determined by a strobe pulse acknowledgement signal and for delivering said stored code signal to said data line; said input-output channel unit comprising: first receiving means connected to said start informing signal line for receiving said start informing signal as a received informing signal; first transmitting means connected to said first receiving means and said start informing acknowledgement signal line for transmitting said received informing signal to said start informing acknowledgement signal line as a start informing acknowledgement signal; registering means connected to said data line and said first receiving means and enabled by said received informing signal for registering said stored code signal as a registered code signal; second receiving means connected to said strobe pulse signal line for receiving said strobe pulse signal as a received pulse signal; second transmitting means connected to said second receiving means and said strobe pulse acknowledgement signal line for transmitting said received pulse signal to said strobe pulse acknowledgement signal line as said strobe pulse acknowledgement signal line as said strobe pulse acknowledgement signal; and second storing means connected to said data line, said second receiving means, and a main memory; said first storing means being connected to a peripheral device; said first and said second storing means being for use in transferring transfer data between said main memory and said peripheral device through said data line after said registering means registers said stored code signal, said first and said second storing means being for storing said transfer data as first and second stored data at said first period and a second period determined by said received pulse signal; wherein:

said input-output channel unit comprises:
overrun storage capacity predicting means connected to said second storage means for predicting an occurrence of an overrun on the basis of an amount of said second stored data to produce an overrun prediction signal;
said first transmitting means being connected to said overrun predicting means for transmitting said overrun prediction signal to said start informing acknowledgement signal line; and
said peripheral controller comprising:
strobe inhibiting means connected to said start informing acknowledgement signal line, said strobe pulse signal generating means, and said strobe pulse signal line and responsive to said overrun prediction signal for inhibiting delivery of said strobe pulse signal to said strobe pulse signal line during a predetermined time interval.

2. A data transfer system comprising:
a peripheral controller;
an input-output channel unit;
a first buffer memory in said peripheral controller;
a second buffer memory in said input-output channel unit;
a data line connecting said first and second buffer memories;
an overrun predicting circuit receiving data transferred over the data line under control of a strobe pulse signal, for producing and transmitting, before data is transferred over the data line between the peripheral controller and the input-output channel, an overrun prediction signal, the overrun prediction signal being produced on the basis of an amount of data stored in said second buffer memory and transmitted to the data line; and a strobe inhibiting circuit contained in the peripheral controller, the strobe inhibiting circuit responsive to the overrun predicting circuit connected to the data line and responsive to the overrun prediction signal for inhibiting delivery of said strobe pulse signal from the peripheral controller to the input-output channel unit for a predetermined time interval.

3. The data transfer system of claim 2, in which the first buffer memory is connected to a peripheral device and the second buffer memory is connected to a main memory.

4. The data transfer system of claim 2, wherein a delay circuit and a receiver are connected between the data line and the strobe inhibiting circuit, the data line being connected to the overrun predicting circuit.

5. The data transfer system of claim 2, wherein:
said overrun prediction signal is produced when said buffer memory memorizes an amount of transferred data either at an upper threshold amount or at a lower threshold amount.

6. A data transferring system for transferring transfer data between a first unit, being a peripheral controller unit and an input-output channel second unit, said first unit comprising a first buffer memory for storing said transfer data as first data in response to a start informing signal produced therein and a strobe pulse acknowledgement reception signal, said second unit comprising a second buffer memory for storing second data in response to a received informing signal and a received pulse signal, said first and said second buffer memories being connected through a data line for transmitting said first data for storage in said second buffer memory as said second data, said first and said second units also being connected through a start informing signal line for said start informing signal, a start informing acknowledgement signal line for sending a start informing acknowledgement signal produced in said second unit in response to the start informing signal received through said start informing signal line as said received informing signal, a strobe pulse signal line for sending a strobe pulse signal produced in said first unit, and a strobe pulse acknowledgement signal line for sending a strobe pulse acknowledgement signal, which is produced in said second unit in response to the strobe pulse signal received as said received pulse signal and is received by said first unit as said strobe pulse acknowledgement reception signal, wherein said second unit comprises:

an overrun predicting circuit connected to said second buffer memory for producing an overrun prediction signal on the basis of an amount of data stored in said second buffer memory as said second data; and transmitting means connected to said overrun predicting circuit and to said start informing acknowledgement signal line for transmitting said overrun prediction signal to said start informing acknowledgement signal line;

said first unit comprising strobe pulse inhibiting means connected to said start informing acknowledgement signal line and to said strobe pulse signal line, and responsive to the overrun prediction signal received through said start informing acknowledgement signal line for inhibiting delivery of said strobe pulse signal to said strobe pulse signal line during a predetermined time interval.

7. A data transferring system as claimed in claim 6, wherein said transmitting means further comprises:
an OR gate connected to said overrun predicting circuit and supplied with said start informing acknowledgement signal for producing said start informing acknowledgement signal and said overrun prediction signal collectively as an OR output signal; and a transmitter connected to said OR gate and to said start informing acknowledgement signal line for transmitting said OR output signal to said start informing acknowledgement signal line.

8. A data transferring system as claimed in claim 7, wherein the buffer memory of said peripheral controller unit is connected to a peripheral device, the buffer memory of said input-output channel second unit being connected to a main memory.

9. A data transferring system as claimed in claim 7, said first unit further comprising a strobe pulse signal generator for producing said strobe pulse signal and a signal producer for producing said start informing signal, wherein said strobe inhibiting means comprises:
a receiver connected to said start informing acknowledgement signal line for receiving said OR output signal to produce said start informing acknowledgement signal and said overrun prediction signal as a received acknowledgement signal and a received prediction signal;

a delay circuit connected to said receiver for producing a delayed acknowledgement signal and a delayed prediction signal by providing a delay of said predetermined time interval to said received acknowledgement and prediction signals; and a strobe pulse delaying circuit connected to said strobe pulse signal generator, to said signal producer, to said receiver, to said delay circuit and to said strobe pulse signal line for supplying said strobe pulse signal line with the strobe pulse signal which is produced while neither said delayed acknowledgement and prediction signals, nor said start informing signal, are produced.

* * * * *